United States Patent [19]

Anadoliev

[11] 4,138,801

[45] Feb. 13, 1979

[54] METHOD OF PROPAGATING SELECTED FILBERT VARIETIES

[75] Inventor: Georgi S. Anadoliev, Kardjali, Bulgaria

[73] Assignee: Glavno Upravlenie Rastenievadstvo pri MZHP, Sofia, Bulgaria

[21] Appl. No.: 748,384

[22] Filed: Dec. 7, 1976

Related U.S. Application Data

[63] Continuation-in-part of Ser. No. 651,411, Jan. 22, 1976, abandoned.

[51] Int. Cl.² .............................................. A01G 1/00
[52] U.S. Cl. .................................... 47/58; 47/DIG. 3
[58] Field of Search ................... 47/58, DIG. 3, 5.5-7

[56] References Cited
PUBLICATIONS

Handbook of N. Am. Nut Trees, Jaynes, 1969, NNGA, pp. 22-29, and 287-293.

*Primary Examiner*—Robert E. Bagwill

[57] ABSTRACT

Method of obtaining engrafted engrafting material from a giant filbert tree. Engrafting takes place on Turkish filbert shoots and afterwards the shoots engrafted are stratified in a neutral granular medium preferably composed of swelled perlite, the temperature being maintained at about 35 – 38° C. in the room throughout the first 6 – 7 days and at about 25 – 28° C. during the following 15 – 18 days. The relative air humidity is maintained at about 70 – 75%. Just before taking out the material, it is held for a few days at ambient temperature, that is, about 16 – 18° C.

3 Claims, 9 Drawing Figures

METHOD OF PROPAGATING SELECTED FILBERT VARIETIES

CROSS-REFERENCE TO RELATED APPLICATION

This is a Continuation-in-part of copending application Ser. No. 651,411 filed Jan. 22, 1976.

The present invention relates to a method for obtaining engrafted seedlings of giant filbert Corylus maxima.

There is already known a method for obtaining seedlings from giant filbert trees or bushes by engrafting on Turkish nut shoots in the nursery, using the technical agricultural methods previously applied with engrafting techniques. A disadvantage of this method is that productivity, including the percentage of root taking, is rather low. In this known method the production of engrafted seedlings of giant filbert trees is implemented by rooting or grafting vertical scions through horizontal root stocks, integrated with the mother-plant. As inplantations the so-obtained plants have a scrubby appearance which in turn hinders their further cultivation and leads to yield-losses.

It is an object of the invention to provide a novel method for producing seedlings from giant filbert trees or bushes. Such method has a high productivity of engrafting and ensures a high percentage of root taking between root stock and engraft.

According to the method of this invention, engrafted seedlings from giant filbert nut trees or bushes can be obtained in the following way:

Root stocks from giant filbert trees are raised from seeds gathered from the ripe fruits. Immediately after being gathered, the seeds are stratified in a case (drained) with perlite medium and sand in a ratio of 1:1. More than 70% of the seeds germinate after a stratification period of about 160–180 days under field conditions. The germinated seedlings are planted at the beginning of vegetation directly into a nursery at a distance of 15–80 cm from each other, so that throughout the vegetation period in the year of planting the plants become 50–60 cm high and 0.8–1.2 cm thick.

(a) left: rooted sapling, engrafted by means of a machine PM 450.

(b) right: engrafted sapling of the same brand on a pad formed by a Turkish filbert with an improved engrafting ("Improved engrafting" means an oblique-cut engraft featuring a little "tongue", fastening the engrafted part)

Figure 3:

FIG. 3 is a photograph of stored engrafted and rooted giant filbert saplings taken out from the stratification chamber. The compartment where the saplings are stored is kept under an approximate day-and-night temperature of 10° C. in order to harden the plants before implantation in a first year nursery.

Figure 4:

FIG. 4 is a photograph of a seedling of a Turkish filbert bush (Corylus colurna L). Originating from Stara-Planina.

Figure 5:
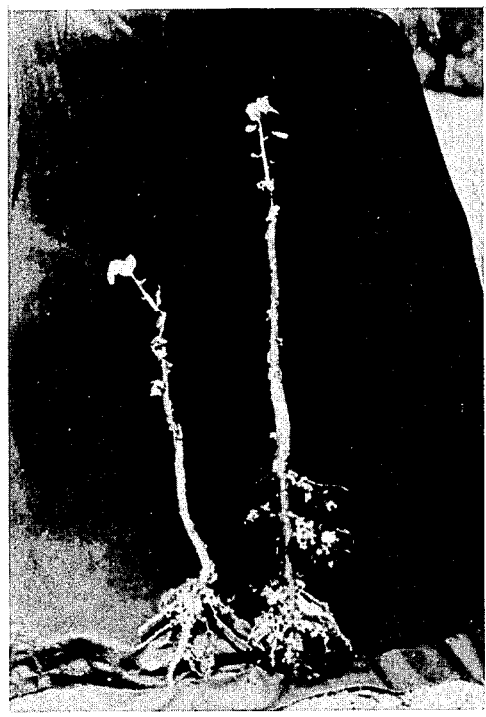

FIG. 5 is a photograph of engrafted Turkish filbert (hazelnut) saplings of the ATA-BABA sort/brand after stratification, highly engrafted.

Figure 6:

FIG. 6 is a photograph of one-year old engrafted hazelnut sapling of the ATA-BABA sort, seen on a rootstock of Turkish filbert.

Figure 7:

FIG. 7 is a photograph of a mother-tree of "Corylus colurna" on which have been grown by engrafting seedlings of giant filbert of the sort "Corylus maxima Mill" or the sort "Corylus avelana L", etc.

Figure 8:
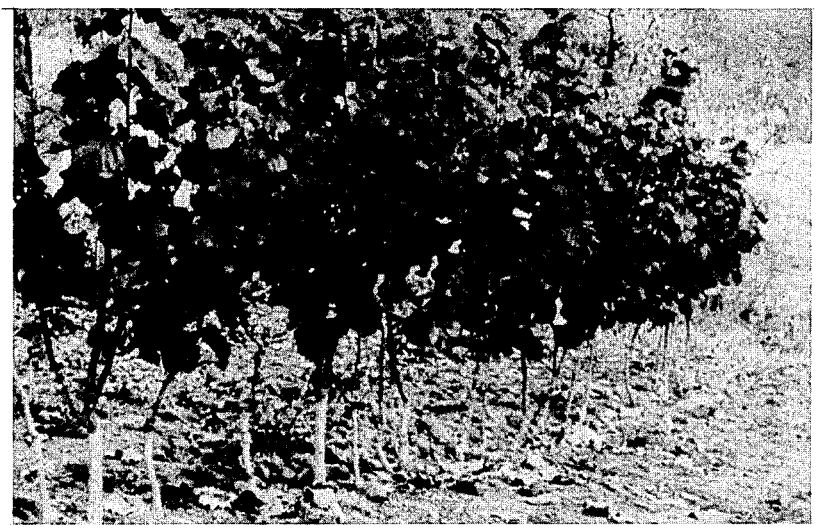
Figure 9:

FIG. 8 is a photograph of Hazelnut saplings of the ATA-BABA sort, as seen in the second year nursery, being engrafted at a substantial distance above the next of rootstocks of Turkish filbert and FIG. 9 is a photograph of hazelnut saplings of the ATA-BABA sort, as seen in a second year nursery, being engrafted slightly over the radix-neck of rootstocks of a Turkish filbert.

Figure 1:
FIG. 1 is a photograph of a five-year old bush of the giant filbert sort ATA-BABA (Corilus maxima Mill) at the specified implantation in the Experimental Base - Kirjalii.

In FIG. 1 there is shown a seedling of Turkish filbert Corylus colurna photographed in July, 1972. Rich, fresh and warm soil is chosen for the nursery. Such soil should have the following agrotechnical characteristics:

In 1000 g of soil the available (movable) nitrogen forms weigh 40–46 mg and about 2% of humus and the active acidity is 6–7. Fertilizing is performed with 5–6 tons of animal fertilizer per 1000 sq. meters; the plants are fed twice and are watered twice.

The root stocks are taken out, sometimes in the autumn after the fall of the leaves of the seedlings, and are preserved. Sometimes, however, this is done in spring before vegetation when engrafting starts. Engrafts from giant filbert Corylus maxima are taken immediately before engrafting. They should be firm, well constructed and with a plurality of physiologically firm leaves from the past year.

High engrafting 35–40 cm up the stem from the neck of the root is employed. In length the oblique cut of the engraft and the pad is one and a half times their thickness. The engraft should be as thick as the root stock or thinner. A slightly thinner engraft makes it possible for the cambial layer of the two components to coincide. It is characteristic of nut engrafting that a callus is formed from the cambial tissue as well as from the wood close to it. Therefore, species with thin bark should be engrafted so as to allow closer contact between the wood of both components.

Engrafting takes place before vegetation. In one preferred procedure, the pads engrafted are arranged in a packing case 75 cm high and 40 cm long and deep. The cases are made of planks nailed with a spacing of 0.5 cm from each other to ensure conditions for most successful root taking (airing, draining, suitable temperature). The trees engrafted are arranged carefully: one layer of trees followed by one layer of granular neutral material preferably perlite, so that each single tree nestles into moistened perlite medium. When all the trees are arranged in the case, the scion (the cap of the engrafted tree) is covered with perlite, which is moistened to about 60% of its maximum moisture-holding capacity. The maximum moisture-holding capacity of the perlite is about 300% of its weight. To 1 kg of swelled perlite 1.8 kg water is added. The swelled perlite preferably has a particle size of 2.5–3 mm and a weight of 80–120 kg per m³. The cases with the engrafted trees arranged in them are put on racks in a room and are held under the following temperature-moisture conditions:

In the first 6–7 days the initial temperature in the room is held at 35°–36° C.; in the next 15–16 days it is held at 25°–28° C., and in the last 2–3 days there is no heating, that is, the room is at ambient temperature. The specific humidity in the room is maintained at about 70–75% without additionally dampening the perlite medium. The cases are examined after 22–25 days; the trees that have grafted are then separated. These trees are selected in accordance with the grown shoots of the scion, while the rest of the trees that have formed a callus but have no grown buds are arranged again for a second stratification.

The engrafted trees, after being taken out of the cases are then placed in a lightened room at a temperature of 8°–10° C. and arranged in 22 horizontal layers: a layer of damp sand followed by a layer of trees, etc. The scion and the place of engrafting are left uncovered by sand. The taking out of the trees to the fruit-tree nursery occurs only after the full greening of the young shoots which should indicate that the process of hardening is completed. Around that time of the year the average temperature in the fruit-tree nursery is 10° C.

Figure 2:
FIG. 2 is a photograph of engrafted giant filbert saplings of the ATA-BABA brand, engrafted on a Turkish filbert tree on the eighth day from the stratification.

In FIG. 2 there are shown engrafted saplings of coarse-fruit nut C. maxima on Turkish filbert C. columa. Each separate grown tree is planted in a root bed (nursery) at a distance of 30–100 cm from each other after forming a ridge up to 25–30 cm high. Throughout the vegetation the shoots that have taken shape are gradually uncovered until the ridge is removed and the whole stem comes up. This should be completed by the end of June. If necessary, the high shoots are propped by being bound to small stakes.

The following is a preferred embodiment of the method of the invention:

In the first ten days of October 1971, 400 seeds of Turkish filbert were placed for stratification. 350 seeds from them were planted permanently in the seedling nursery of the cooperative farm of the town of Kirjalii. After the plants germinated, their normal growth was ensured by proper care. On February 15, 1972 180 seedlings were taken out and each was engrafted by the English engrafting method with a scion of giant filbert (the engrafts were taken immediately before engrafting). The trees engrafted were arranged in stratification cases in swelled perlite medium of 2–3 mm particle size and a volume weight of 100 kg m$^3$. The perlite was dampened up to 60% of its maximum moisture-holding capacity.

The cases filled with the engrafted seedlings were taken into the stratification room for stratification under the following conditions:

Throughout the first 3 days the temperature in the room was maintained at 38° C. and in the next 16 days were maintained at 27° C., in the last 4 days there was no heating in order to inure the plants to ambient conditions. All 117 plants that had grafted were planted in a nursery, in a ditch previously dug, the plants being earthed up thoroughly so that only part of the germinated shoot of the engraft was left above the surface. The following data serve for comparison between trees obtained by the method of vertical layers (Table I) and the method of the invention for engrafting nut material (Tables II–IV, incl.). See page 7 for Table I.

TABLE I

About the results from engrafting grand filbert course-fruit nut on Turkish filbert dendroid nut under various stratification

| Variants | Room t° in first day | Room t° in afterwards | % of moistening the perlite compared to its maximum moisture-holding capacity % | Relative air humidity % | Placed engrafted plants | Radicated number | With grown shoots No. | With callus No. | Dried unrooted number | Rotten from extensive dampness number |
|---|---|---|---|---|---|---|---|---|---|---|
| 1. | 30–32° | 22–25° | above 90% | above 90% | 130 | 74 | 1 | 73 | — | 129 |
| 2. | 35–38° | 26–28° | about 60% | about 70% | 180 | 142 | 117 | 25 | 38 | — |

TABLE II

Percentage of root taking from engrafting in improved copulation from C.maxima in C.columa

| Variants | Medium for stratification | With callus in % | With grown shoots % |
|---|---|---|---|
| 1. | Swelled perlite with fraction 2.5 – 3 mm and volume weight 120 kg/m$^3$ | 75 | 70 |
| 2. | Sawdust and swelled perlite in ration 1:1 | 65 | 55 |

Plants scions and seeds obtained from one mother plant of coarse-fruit nut and Turkish filbert dendroid nut

TABLE III

| Type of nut | Number of vertical opening from a well developed bush | Buds capable to be engrafted from a well developed bush | Seeds from a tree in full fruiting | Seed contained in 1 kg |
|---|---|---|---|---|
| Turkish filbert Corylus maxima | 25 | 500 | — | — |
| Turkish filbert Corylus columa | — | — | 40 | 1.000 |

TABLE IV

| Variants | Number of trees that can be obtained from one mother tree | |
|---|---|---|
| | In a one-year nursery | in a two-year nursery |
| 1. Trees engrafted by the method of the invention | 240 | 400 |
| 2. Trees engrafted by the method using vertical layers | 14 | 30 |
| 3. Trees engrafted by the method using stem shoots | 100 | 150 |

The data in Tables III and IV show that with a well-developed bush of giant filbert the production methods used so far by vertical saplings through horizontal pads non-separated from the mother plant result in 25–30 plants only. As implantations, the so-obtained plants have a shrubby outlook which in turn hinders their further cultivation and leads to yield losses. The "vertical saplings" represent seedlings of a cultivated nut which are additionally rooted in the nursery. The same bush is capable of yielding more than 500 buds that could be engrafted; from one mother tree of Turkish filbert in full fruiting, more than 40 kg of seeds can be obtained. Each kilogram contains more than 1000 seeds, which means that in theory more than 40,000 pads can be obtained; however, 30-35% of the number of seeds are in effect lost with the sowing or the seedling period. In such case, from a single bush no more than 25-30 normal plants can be obtained through vertical deviations, but with the method of the present invention 350 normal plants can be obtained, even discounting 30-35% of the plants engrafted and planted in a nursery.

The advantages of the method of the invention are (1) the number of the rooted and produced trees is considerably larger, (2) the number of engrafted trees for a given period of time is much higher, (3) the engrafting itself can be mechanized (thus increasing several-fold the productivity of labor), (4) many engrafted seedlings are produced in a first year nursery, (5) the main factors for rooting-temperature and relative air humidity can be controlled, (6) preliminary cold storage of the scion, which otherwise makes production difficult, uncertain and insecure, is avoided, and (7) nursery material is spared because only rooted trees are planted in the nursery.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A method of obtaining engrafted engrafting material from giant filbert, which comprises engrafting seedlings or scions of giant filberts on the rootstocks of Turkish filbert trees or bushes, thereafter stratifying the engrafted trees or bushes in a neutral granular hygroscopic medium located in a room, maintaining a temperature of about 35°-38° C. in the room throughout the first 6-7 days, during the following 15-18 days holding the temperature at about 25°-28° C., throughout the entire above period holding the relative room air humidity at about 70-75%, and just before taking the material out of the room holding the temperature of the room for several days at about 16°-18° C.

2. A method as claimed in claim 1, wherein the granular hygroscopic medium is swelled perlite.

3. A method as claimed in claim 2, wherein the swelled perlite has a particle size of about 2-3 mm and a volume weight of about 80-120 kg/m³.